United States Patent
Schippl

(10) Patent No.: US 6,883,549 B2
(45) Date of Patent: Apr. 26, 2005

(54) CONDUIT FOR THE TRANSPORT OF CYROGENIC MEDIA

(75) Inventor: Klaus Schippl, Hannover (DE)

(73) Assignee: Nexans, Paris (FR)

( * ) Notice: Subject to any disclaimer, the term of this patent is extended or adjusted under 35 U.S.C. 154(b) by 56 days.

(21) Appl. No.: 10/438,205

(22) Filed: May 15, 2003

(65) Prior Publication Data
US 2003/0217779 A1 Nov. 27, 2003

(30) Foreign Application Priority Data
May 15, 2002 (DE) .......................... 102 21 534

(51) Int. Cl.$^7$ ................................. F16L 9/18
(52) U.S. Cl. ................... 138/114; 138/113; 138/148; 138/149; 138/108
(58) Field of Search ................ 138/114, 113, 138/148, 149, 108

(56) References Cited

U.S. PATENT DOCUMENTS

| | | | |
|---|---|---|---|
| 4,046,407 A | 9/1977 | Porreco | 285/123.17 |
| 4,546,798 A * | 10/1985 | Porta | 138/149 |
| 6,257,282 B1 | 7/2001 | Emmer et al. | 138/149 |

FOREIGN PATENT DOCUMENTS

| | | | |
|---|---|---|---|
| DE | 31 42 702 A1 | 5/1983 | |
| DE | 3416089 A1 * | 10/1985 | F16L/59/06 |
| DE | 3426641 A1 | 1/1986 | |
| DE | 3931347 A1 | 3/1991 | |
| EP | 0 326 923 A1 | 8/1989 | |
| WO | WO 01/27514 A1 | 4/2001 | |

OTHER PUBLICATIONS

H. Laeger et al, "Long flexible transfer lines for gaseous and liquid helium", Cryogenics, IPC Science and Technology Press LTD, Guildford, GB Bd. 18, Nr. 1, Dec. 1978, pp. 659–662, XP002124084.

* cited by examiner

Primary Examiner—Patrick Brinson
(74) Attorney, Agent, or Firm—Sughrue Mion, PLLC

(57) ABSTRACT

A conduit for the transport of cryogenic media, in particular a superconducting cable, includes at least two metal pipes arranged concentrically and spaced apart from one another, an insulation layer being situated in the annular gap between the metal pipes and the annular gap being evacuated. The exterior of the metal pipe (4) is separated at predetermined intervals and above each opening a pump connector (10) is welded vacuum-tight to the outer metal pipe (4).

6 Claims, 1 Drawing Sheet

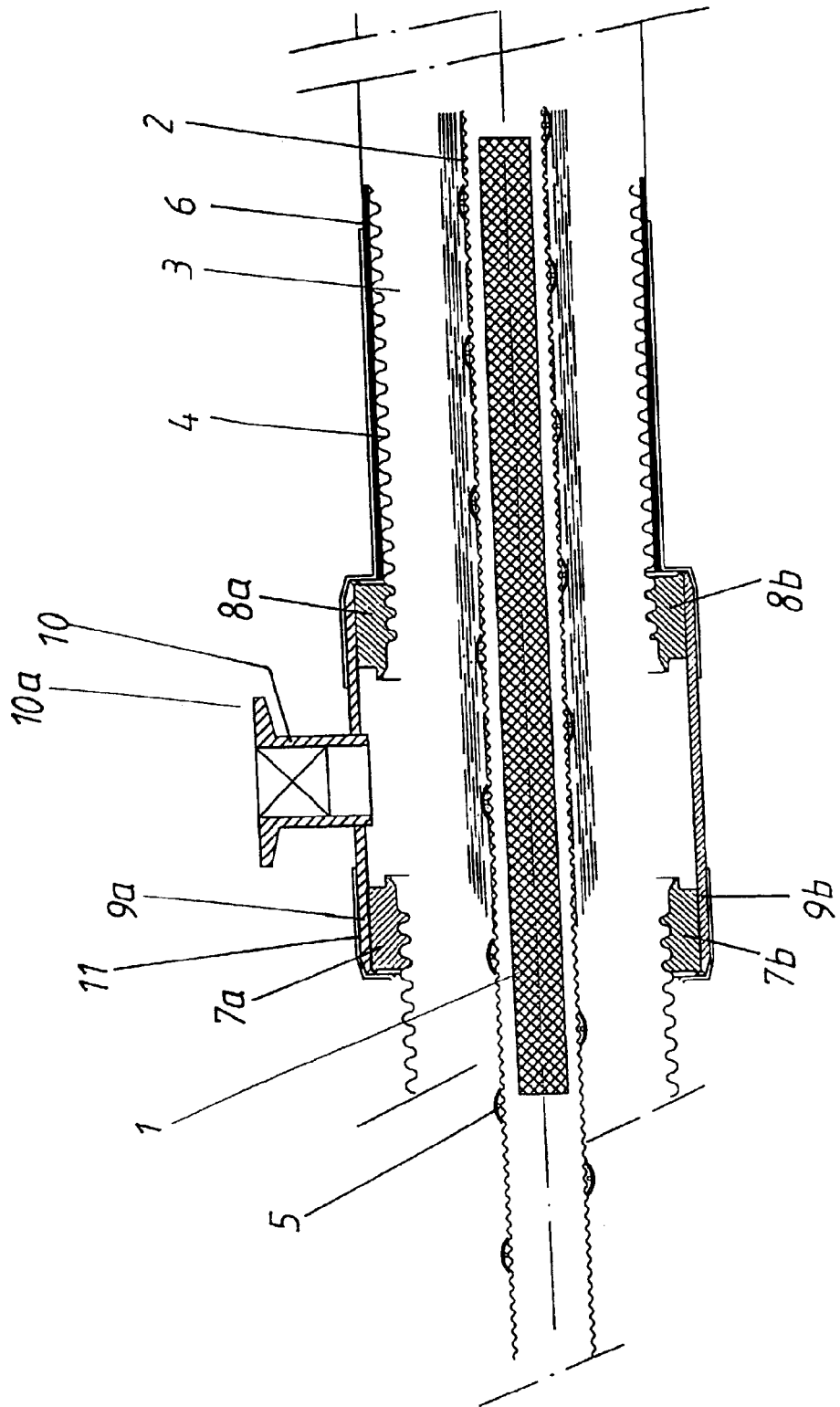

CONDUIT FOR THE TRANSPORT OF CYROGENIC MEDIA

This application is based on and claims the benefit of German Patent Application No. 10221534.0 filed May 15, 2003, which is incorporated by reference herein.

BACKGROUND OF THE INVENTION

The invention relates to a conduit for the transport of cryogenic media, and to a method of manufacturing a such conduit.

A conduit for the transport of cryogenic media is known from European Patent Application 0 326 923 which comprises two corrugated metal pipes arranged concentrically and spaced apart from one another, and spirally wound superinsulation made of alternating superposed layers of metal foil or metallized plastic film and insulation material, for example fiberglass non-woven fabric, being situated in the annular gap between the metal pipes and the annular gap being evacuated. The vacuum is created for example by pumps in the annular gap, the pump connection being made at the end of the conduit or on both ends of the conduit.

Because of the tightly packed superinsulation intended to hold the pipes in a concentric arrangement, the pumping procedure is very lengthy.

Accordingly, in European Patent Application 0 326 923 separate spacing is provided between the inner pipe and the first layer of the superinsulation winding, which significantly accelerates the evacuation process. This procedure enables conduits up to 100 m in length to be economically evacuated.

The development of new superconducting materials which enter the superconducting state at temperatures above 50° K. has made superconducting cables economical by greatly lowering the cost of cooling.

The conduit according to European Patent Application 0 326 923 is superbly suited as a "cryogenic envelope" for superconducting cables due to the fact that it combines good flexibility, a good insulating effect, and a simple cable manufacturing technique. Such superconducting cables are economical only if it is possible to manufacture lengths greater than 100 m, preferably up to 500 m, depending on the diameter. However, lengths greater than 100 m cannot be economically evacuated according to the current state of the art.

SUMMARY OF THE INVENTION

The object of the present invention, therefore, is to improve the known conduit in such a way that enables the annular gap to be rapidly evacuated, even for lengths greater than 100 m.

This object is achieved by a conduit wherein the exterior of the metal pipe is separated at predetermined intervals, and above each opening a pump connector is welded vacuum-tight to the outer metal pipe.

The object of the invention is further achieved by a method of manufacturing such a conduit, wherein a metal band is formed in a continuous operation into a pipe having a longitudinal slit, the longitudinal slit is welded, the welded pipe is corrugated, and an insulation layer is placed on the corrugated pipe by winding, an additional metal band is formed in a continuous operation around the insulated corrugated metal pipe to obtain a corrugated pipe having a longitudinal slit, the longitudinal slit is welded, the welded pipe is corrugated, a length of the welded pipe is discon- nected from the outer pipe at certain intervals, the opening is covered by half-shells, the half-shells are welded vacuum-tight to the outer pipe, and at least one pump is connected to a pump connection provided on the half-shells, for evacuating the annular gap.

Further characteristics and advantages of the invention will be apparent from the description and claims below.

BRIEF DESCRIPTION OF THE DRAWINGS

The invention is explained in more detail with reference to an exemplary embodiment schematically illustrated in the FIGURE.

DETAILED DESCRIPTION OF THE INVENTION

The FIGURE shows a cross-section through a lateral view of a superconducting cable which comprises superconductor 1 and a "cryogenic envelope" comprising an inner pipe 2, superinsulation 3, and an outer pipe 4. Superconductor 1 is preferably composed of a mixed oxide manufactured in a known manner as a wire from fibers in a silver matrix. Inner pipe 2 is a longitudinally welded corrugated pipe made of austenitic steel. A spacer 5 in the form of a helix is wound onto inner pipe 2. Superinsulation layer 3, which comprises alternately applied layers 3a of reflective metal foil and non-heat conducting material, for example fiberglass non-woven fabric, is arranged on inner pipe 2 and spacer 5. The layer adjoining inner pipe 2 is a metal foil.

Outer pipe 4 is also a longitudinally welded corrugated pipe made of austenitic steel. Outer pipe 4 is enclosed by a plastic casing 6.

The illustrated superconducting cable may be manufactured in large lengths in a continuous operation common in cable technology, the maximum length being limited by the capacity of the transport means, for example, by the size of the cable drum.

The superconductor pulled off from a supply reel, not shown, is enclosed in a continuous operation by a band made of austenitic steel which is longitudinally welded, corrugated, and wound onto a supply reel. In a next procedural step the spacer and superinsulation are wound onto the metal pipe which is pulled off from the supply reel. This structure is tubularly enclosed by a band of austenitic steel, and the metal pipe is longitudinally welded and corrugated. Finally, a plastic casing is extruded onto the corrugated outer pipe.

In the superconducting cable manufactured in this manner, plastic casing 6 and outer pipe 4 are removed at predetermined intervals of 100 m, for example.

One pair of half-shells 7a, 7b and 8a, 8b is placed on each end of outer pipe 4, and both pairs are welded vacuum-tight at their partition lines and at their mutually facing end faces. Half-shells 7a, 7b and 8a, 8b are also made of austenitic steel. As shown in the FIGURE, half-shells 7a, 7b and 8a, 8b have a profiling, fitted to the shape of the corrugation of outer pipe 4, on their surfaces facing outer pipe 4. The profiling makes a positive-fit connection between the half-shells, and the rings welded from half-shells 7a, 7b and 8a, 8b, and outer pipe 4, thereby relieving pressure from the welded seam.

Two half-shells 9a and 9b manufactured from sectional sheets made of austenitic steel are placed around and over the rings formed from half-shells 7a, 7b and 8a, 8b and are welded vacuum-tight on their separating edges as well as on their ends to half-shells 7a, 7b and 8a, 8b. Half-shell 9a has a pipe connector 10 with flange 10a to which a vacuum pump may be connected.

A protective collar 11 may then be placed around and over half-shells 9a, 9b and plastic casing 6.

The annular gap situated between inner pipe 2 and outer pipe 4, which is partially filled with the superinsulation layer, is sealed vacuum-tight from the outside at both ends of a length of cable.

After this preliminary operation is completed, vacuum pumps, not shown, are connected to flange 10a which evacuate the annular gap.

For a cable length of approximately 500 m, four pump connections are provided spaced 100 m apart. To collect residual gases released into the annular gap after evacuation, a getter material may be introduced into the annular gap, preferably during manufacture of the pump connections.

What is claimed is:

1. A conduit carrying a cryogenic superconductor cable, said conduit further comprising at least inner and outer metal pipes arranged concentrically and spaced apart from one another, an insulation layer being situated in an annular gap between the metal pipes, and the annular gap being evacuated, wherein the exterior of the outer metal pipe is separated at predetermined intervals to form openings and above each opening a pump connector is welded vacuum-tight to the outer metal pipe, wherein the pump connectors each have metal ring halves separated from one another at a distance along the longitudinal axis, said metal ring halves being welded to the ends of the corrugated metal pipe which is open all around, and wherein two casing halves, in the lateral surface of which is provided a connector for a pump, cover the metal rings and are welded vacuum-tight to their lateral surface.

2. A conduit according to claim 1, wherein the metal pipes are longitudinally welded and corrugated, and wherein said metal ring halves have an internal profiling corresponding to the corrugation of the outer pipe.

3. A conduit according to claim 1, wherein the insulating layer comprises alternating superposed layers of insulation material and reflective material.

4. A conduit according to claim 1, wherein the pump connections comprise two half-shells which are welded vacuum-tight to one another at their partition line.

5. A conduit according to claim 1, wherein the pump connections are situated at intervals of 50–150 m apart.

6. A conduit according to claim 1, wherein in the region of the pump connections getter material is introduced into the interior space between the pipes.

* * * * *